United States Patent [19]

Sperling

[11] 4,300,788
[45] Nov. 17, 1981

[54] PASSIVE RESTRAINT SYSTEM

[76] Inventor: Gustav Sperling, 812 S. Bedford St., Los Angeles, Calif. 90035

[21] Appl. No.: 75,040

[22] Filed: Sep. 12, 1979

[51] Int. Cl.³ .............................................. B60R 21/10
[52] U.S. Cl. .................................. 280/748; 280/753; 297/487
[58] Field of Search ............... 280/748, 751, 753, 802; 297/487, 488

[56] References Cited

U.S. PATENT DOCUMENTS

| | | | |
|---|---|---|---|
| 3,759,343 | 9/1973 | Monaghan | 280/753 X |
| 3,811,701 | 5/1974 | Grime | 280/802 X |
| 3,837,670 | 9/1974 | Hilyard | 280/753 |
| 3,874,476 | 4/1975 | Monaghan | 280/753 X |
| 3,899,042 | 8/1975 | Bonar | 280/753 X |
| 3,977,701 | 8/1976 | Weman | 280/802 |

FOREIGN PATENT DOCUMENTS 2301270 7/1974 Fed. Rep. of Germany ...... 280/751
1245452 9/1971 United Kingdom ................ 280/748

Primary Examiner—Joseph F. Peters, Jr.
Assistant Examiner—Michael Mar
Attorney, Agent, or Firm—Kinzer, Plyer, Dorn & McEachran

[57] ABSTRACT

A passive restraint system for use in motor vehicles which is responsive to the closing of a vehicle door to activate the restraining member of the device. The restraining member is hinged to a center-mounted pedestal and is spring-biased to a vertical position. Closing the vehicle door causes a pushrod mounted under the seat to rotate a take-up roller at the base of the pedestal. This in turn winds up a cable attached to the restraining member, causing the member to swing down to a closed, horizontal position. In this position, the restraining member extends across the lap of a vehicle occupant. The position of the restraining member is made adjustable to suit a particular occupant.

4 Claims, 13 Drawing Figures

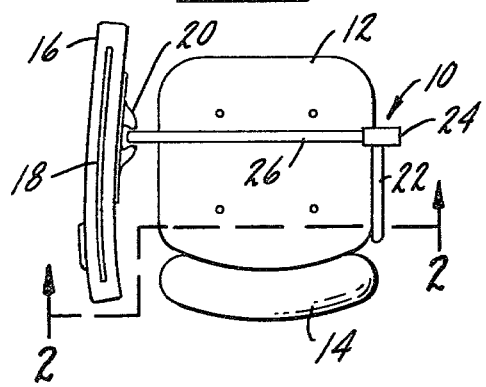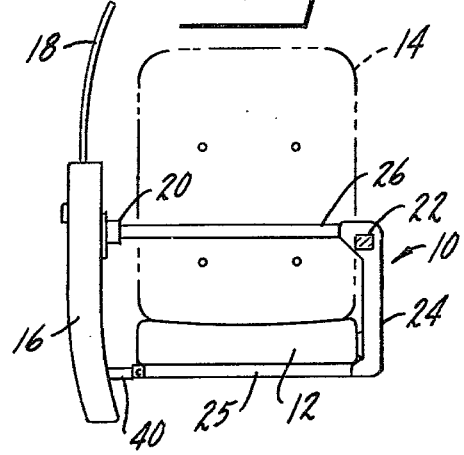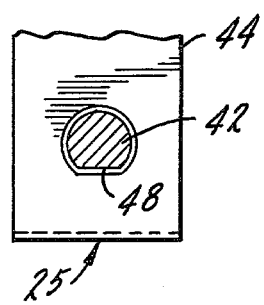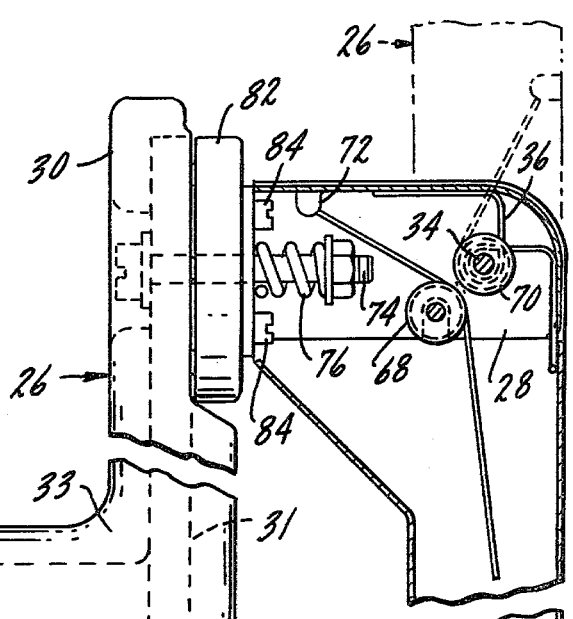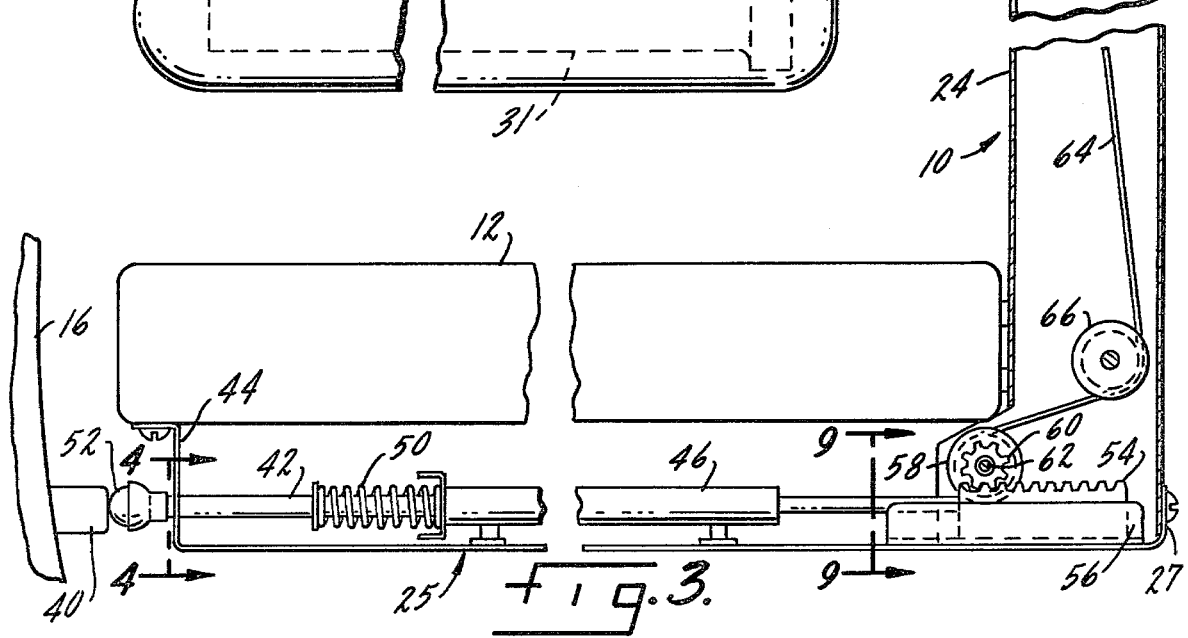

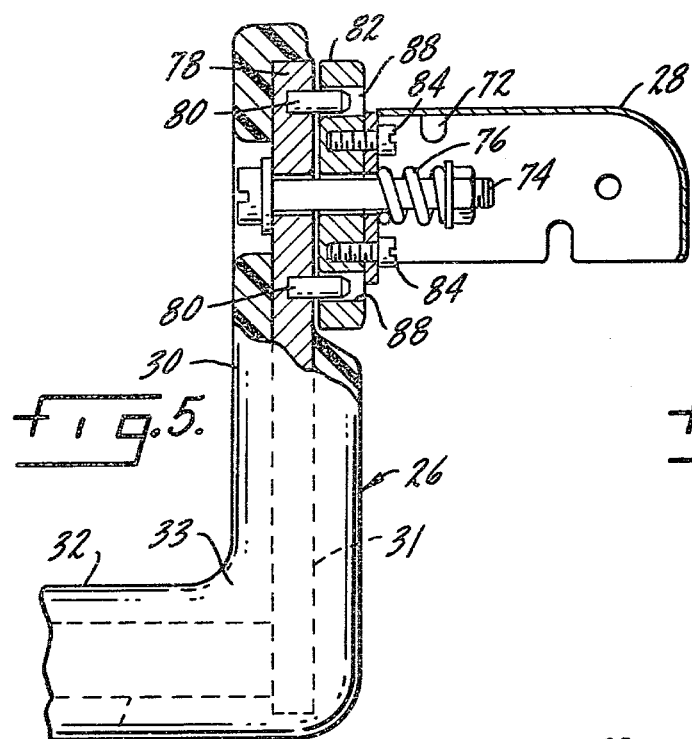
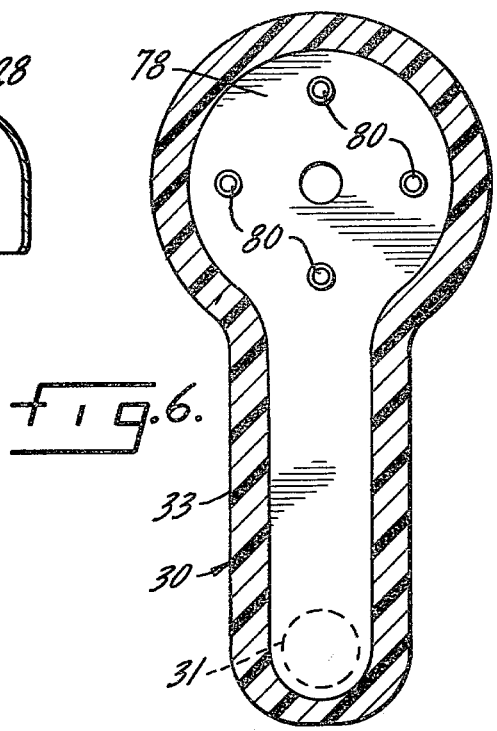
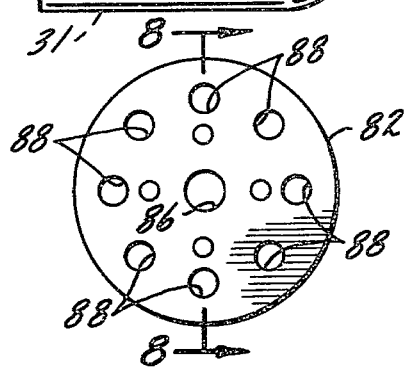
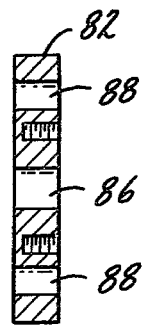
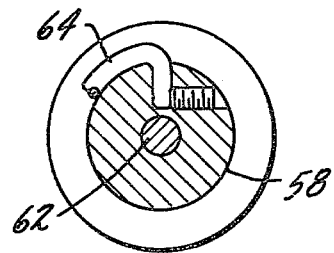
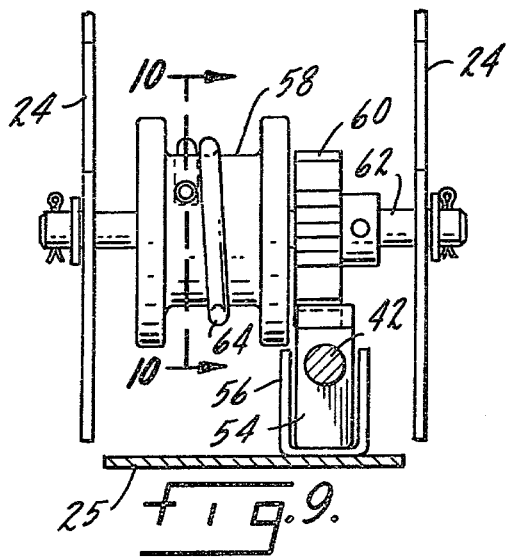
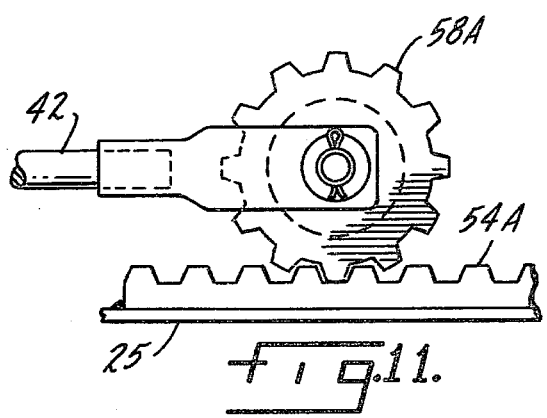

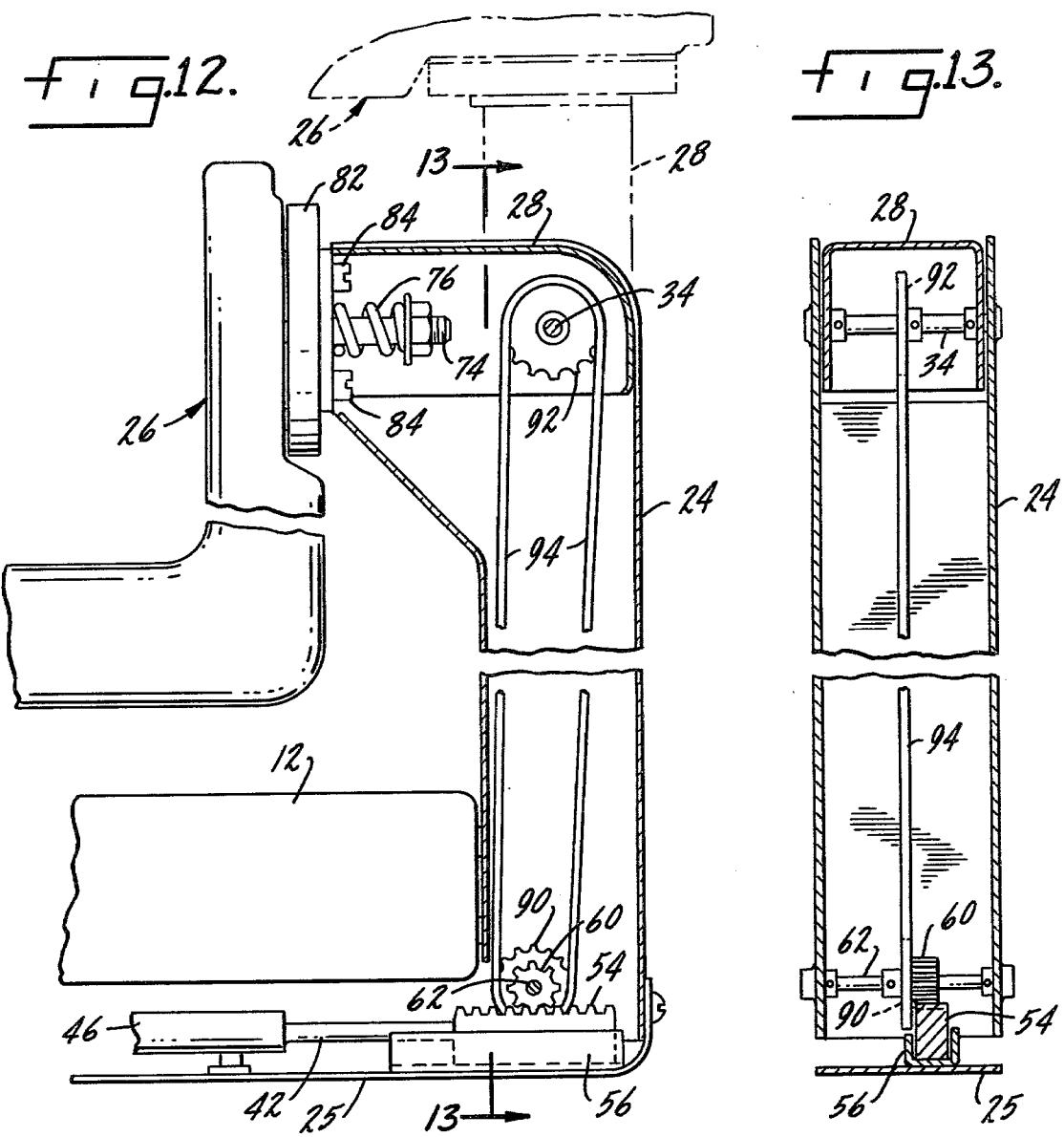

PASSIVE RESTRAINT SYSTEM

SUMMARY OF THE INVENTION

This invention is concerned with occupant safety systems for motor vehicles. In particular, it is concerned with a so called passive restraint system which requires no manipulation on the part of the occupant to make the system operative.

A primary object of the present invention is a passive restraint system which is activated by closing the vehicle door next to the occupant.

Another object is a passive restraint system which is of a simple construction and is reliable in operation.

Another object is a passive restraint system which is adjustable to accomodate different occupants.

Other objects will appear from time to time in the following specification and drawings.

BRIEF DESCRIPTION OF THE DRAWINGS

FIG. 1 is a plan view of a motor vehicle seat and a portion of a door with the passive restraint system of the present invention installed.

FIG. 2 is a rear elevation view of a motor vehicle seat, taken along line 2—2 of FIG. 1.

FIG. 3 is a rear elevation view of the passive restraint system according to the present invention.

FIG. 4 is a section taken along the line 4—4 of FIG. 3.

FIG. 5 is an elevation view of the restraining arm of the present invention.

FIG. 6 is an elevation view of the offset arm portion of the restraining arm.

FIG. 7 shows the positioning disc of the restraining arm.

FIG. 8 is a section taken along the line 8—8 in FIG. 7.

FIG. 9 is a side elevation view of the bottom portion of the passenger restraint system, taken along line 9—9 of FIG. 3.

FIG. 10 is a section view of the take-up roller taken along line 10—10 of FIG. 9.

FIG. 11 is an alternate configuration for the take-up roller.

FIG. 12 is a rear elevation view of an alternate embodiment of the present invention.

FIG. 13 is a section taken along line 13—13 of FIG. 12.

DETAILED DESCRIPTION OF THE INVENTION

FIGS. 1 and 2 show a passive restraint system 10 according to the present invention. Also shown is an occupant seat having a seat cushion 12 and a seat back 14. The vehicle door is shown at 16 and it includes a window 18 and a mounting plate 20. The mounting plate is built into the door panel and permits a horizontal and vertical adjustment for correlation with the restraint system. The seat may include a padded arm rest 22.

The passive restraint system 10 includes a pedestal 24 attached to the inside edge of the seat cushion frame. A mounting plate with turned-up edge 27 extends underneath the seat cushion. The pedestal base is connected to the mounting plate edge 27. The mounting plate is attached to the seat frame so that the system moves with the seat when the seat position is adjusted. A restraining arm 26 extends horizontally across the seat and connects to the mounting plate 20. Thus when an occupant is seated in the vehicle and the door is closed the restraining arm extends across the occupant's lap.

The details of the passive restraint system and its opening and closing mechanism can be seen in FIGS. 3 and 9. As noted above, the restraining arm 26 is hinged to the pedestal 24. The restraining arm in a preferred embodiment comprises three parts; a mounting channel 28, an offset arm 30 and a restraining member 32. The offset arm and restraining member have a steel support or core, shown in hidden lines at 31, covered by padding material 33.

The mounting channel 28 is fixed to the pedestal 24 by a hinge pin 34. The hinge pin extends through holes in the sides of the pedestal and mounting channel. The hinge pin also supports a spring 36. The spring urges the restraining arm 26 to an open upright position shown in phantom. This is the position the restraining arm will be in when the vehicle door is open.

A retractor means is provided to swing the restraining arm from an open, vertical position to the closed, horizontal position shown in FIG. 3. The retractor means includes a cam 40 affixed to the lower portion of the door 16. A pushrod 42 is slidably mounted in the seat frame bracket 44 underneath the seat. A sleeve 46 holds the pushrod 42 in position. In addition, the pushrod 42 has a flat surface 48 at the bottom to prevent it from tilting (FIG. 4). The pushrod is biased leftward as seen in FIG. 3 by a spring 50. The end of the pushrod nearest the door has a knob 52 for engaging the cam 40.

The opposite end of the pushrod 42 is connected to a rack 54. A rack guide channel 56 constrains the rack to linear motion. A take-up roller 58 includes a spur gear 60, both mounted on a shaft 62. The shaft is in turn mounted in the pedestal 24. The teeth of the spur gear 60 engage those of the rack 54.

A cable 64 is connected at one end to the take-up roller 58 (FIG. 10). The cable extends from the take-up roller up through the pedestal 24, guided by a series of guide rollers 66, 68 and 70. The cable connects to a lug 72 in the restraining arm mounting channel 28.

The adjustment mechanism for the restraining arm is shown in FIGS. 5-8. The connection between the offset arm 30 and the mounting channel 28 provides the adjustment feature. The offset arm is connected to the mounting channel by a shaft 74. The shaft has a spring 76 mounted inside the mounting channel 28. This allows the offset arm to be pulled outwardly away from the mounting channel. The offset arm has a circular end portion 78 (FIG. 6) with positioning pins 80 located therein. A positioning disc 82 is attached by screws 84 to the end of the mounting channel 28. The positioning disc has a center hole 86 through which the connecting shaft 74 extends. The positioning disc also has a plurality of holes 88 arranged in a circle. The positioning pins 80 of the offset arm engage these holes 88 to hold the offset arm in a selected orientation. When an occupant wishes to change the position of the restraining member 32, he pulls the offset arm such that the positioning pins 80 come out of the holes 88. The offset arm is then rotated until the new, desired position is reached. Then the positioning pins move back into the new set of the holes under the urging of the spring 76.

The use, operation and function of the invention are as follows:

When the vehicle door is open, the restraining arm 26 assumes a vertical, open position which permits access to the vehicle seat. When the occupant is seated and closes the door, the following actions take place. The cam 40 contacts the knob 52 of the pushrod 42. The pushrod slides toward the pedestal 24, causing the rack 54 to rotate the take-up roller 58. This rotation results in the cable 64 being wound up on the take-up roller. This shortens the available cable length, causing the cable to pull down on the restraining arm 26 with the result that the restraining arm swings to the closed position. If the occupant then desires to adjust the restraining arm to a more comfortable position, he can do so in the manner described above. When the vehicle door is open, the spring 50 moves the pushrod 42 such that the rack causes the unwinding of the cable on the take-up roller 58. The restraining arm then moves back to the open, vertical position under the urging of the spring 36.

An alternate mounting for the take-up roller and rack is shown in FIG. 11. In this configuration, the rack 54A is held fixed while a combined spur gear and take-up roller 58A is mounted for rotation on the end of the pushrod 42. The sliding motion of the pushrod then causes the cable to wind and unwind on the take-up roller as in the previously described embodiment.

A further alternate embodiment is shown in FIGS. 12 and 13. In this embodiment the take-up roller and cable have been replaced by a chain drive and sprocket wheel. A first sprocket 90 replaces the take-up roller on shaft 62. A second sprocket 92 is mounted on the hinge pin 34 at the top of the pedestal 24. A chain 94 engages the first and second sprockets to convert the linear motion of the pushrod to the rotational motion required to swing the restraining arm between the open and closed position. It will be noted that in this embodiment the spring at the restraining arm has been deleted so the spring 50 on the pushrod is responsible for creating linear motion in the rack which will in turn cause the restraining arm to be raised.

It will be realized that whereas a practical and operable device has been shown and described, many alterations could be made in size, shape and disposition of parts without departing from the spirit and scope of the invention. For example, the restraining arm 26 could be a straight piece, with no offset arm. It is therefore desired that the description and drawings be taken in a broad sense as illustrative and diagrammatic rather than as limiting the invention to the specific showing.

I claim:

1. A passive restraint system for motor vehicles comprising:
   a pedestal mounted to a seat frame, at the inside edge of a seat;
   a restraining arm hinged to the top of the pedestal;
   a spring attached to the pedestal urging the restraining arm to an open, vertical position; and
   retractor means for swinging the restraining arm from its open, vertical position to a closed, horizontal position wherein the restraining arm extends across an occupant's lap, the retractor means including a cam attached to the vehicle door, a pushrod slidably mounted underneath the seat one end of the pushrod having a portion for engaging the cam, a rack connected to the other end of the pushrod, a takeup roller mounted for rotation on the pedestal, the take-up roller having a spur gear whose teeth engage those of the rack, and a cable connected at one end of the take-up roller and at the other end to the restraining arm, the sliding of the pushrod upon closing of the vehicle door causing the take-up roller to shorten the available cable length which in turn causes the restraining arm to swing to the closed position, while opening the door releases the retractor means, allowing the restraining arm to return under the urging of the spring to its open, vertical position.

2. A passive restraint system for motor vehicles comprising:
   a pedestal mounted to a seat frame, at the inside edge of a seat;
   a restraining arm hinged to the top of the pedestal;
   a spring attached to the pedestal, urging the restraining arm to an open, vertical position; and
   retractor means for swinging the restraining arm from its open, vertical position to a closed, horizontal position wherein the restraining arm extends across an occupant's lap, the retracting means including a cam attached to the vehicle door, a pushrod slidably mounted underneath the seat, one end of the pushrod having a portion for engaging the cam a rack connected to the seat frame near the base of the pedestal, a take-up roller mounted for rotation on the end of the push-rod, the take-up roller including spur gear teeth which engage those of the rack, and a cable connected at one end to the take-up roller and at the other end to the restraining arm, the sliding of the pushrod upon closing of the vehicle door causing the take-up roller to shorten the available cable length which in turn causes the restraining arm to swing to the closed position, while opening the door releases the retractor means, allowing the restraining arm to return under the urging of the spring to its open, vertical position.

3. A passive restraint system for motor vehicles comprising;
   a pedestal mounted to a seat frame, at the inside edge of a seat;
   a restraining arm hinged to the top of the pedestal;
   a spring attached to the pedestal, urging the restraining arm to an open, vertical position; and
   retractor means for swinging the restraining arm from its open, vertical position to a closed, horizontal position wherein the restraining arm extends across an occupant's lap, the retractor means including a cam attached to the vehicle door, a pushrod slidably mounted underneath the seat, one end of the pushrod having a portion for engaging the cam a rack connected to the other end of the pushrod, a first chain sprocket mounted for rotation on the pedestal, the sprocket including a spur gear whose teeth engage those of the rack, a second chain sprocket connected to the restraining arm, and a chain drive connected between the first and second sprockets which upon sliding of the rack will cause the second sprocket to swing the restraining arm between the open and closed positions.

4. The structure of claim 2 or 3 wherein the restraining arm position is adjustable, the restraining arm including:
   a mounting channel hinged to the pedestal;
   a positioning disc attached to one end of the mounting channel, the disc having a plurality of holes arranged in a circle;
   an offset arm having a circular end portion with positioning pins therein, the circular end portion being connected to the mounting channel by a springloaded shaft extending through the positioning disc, the positioning pins of the offset arm being selectively engagable with the disc holes to hold the offset arm in a selected orientation; and a restraining member connected to the free end of the offset arm such that the position of the restraining member depends on the orientation of the offset arm.

* * * * *